United States Patent
Bolledi et al.

(10) Patent No.: US 6,357,565 B1
(45) Date of Patent: Mar. 19, 2002

(54) SHOCK-ABSORBING DEVICE FOR SPINDLE HEADSTOCKS

(75) Inventors: Giuseppe Bolledi, Ponte dell'Olio; Massimo Bertuzzi, Gazzola, both of (IT)

(73) Assignee: Machining Centers Manufacturing S.p.A., Vigolzone (IT)

( * ) Notice: Subject to any disclaimer, the term of this patent is extended or adjusted under 35 U.S.C. 154(b) by 0 days.

(21) Appl. No.: 09/447,221

(22) Filed: Nov. 23, 1999

(30) Foreign Application Priority Data

Nov. 27, 1998 (IT) .......................... MI98A2578

(51) Int. Cl.[7] .................................. F16F 7/12
(52) U.S. Cl. .................... 188/371; 82/904; 409/193; 384/215
(58) Field of Search .................... 188/371, 374, 188/375, 377; 82/142, 143, 904; 409/186, 193; 451/1, 11, 27; 384/99, 215, 535, 581, 620

(56) References Cited

U.S. PATENT DOCUMENTS

| | | | | | |
|---|---|---|---|---|---|
| 4,082,019 A | * | 4/1978 | Shichida et al. | ............ | 82/36 A |
| 4,560,289 A | * | 12/1985 | Wood, III | .................... | 384/99 |
| 4,831,785 A | * | 5/1989 | Sigg | .......................... | 51/165 R |
| 5,739,660 A | * | 4/1998 | Gnann | ........................ | 318/626 |

\* cited by examiner

*Primary Examiner*—Pam Rodriguez
(74) *Attorney, Agent, or Firm*—Wenderoth, Lind & Ponack, L.L.P.

(57) ABSTRACT

A shock-absorbing device is intended to be mounted on a spindle headstock of a machine tool. The spindle headstock includes a motor driven spindle unit connected to an upright by a support. The shock-absorbing device comprises a yieldable structure connected on one side to the spindle unit and on the other side to the support, and is adapted to yield upon an accidental collision of the spindle headstock against a workpiece. A collision sensor or is associated with the yieldable structure for detecting the yielding thereof resulting from an accidental collision of the spindle headstock with a workpiece, and for transmitting in response thereto a signal to a machine tool control unit.

19 Claims, 2 Drawing Sheets

SHOCK-ABSORBING DEVICE FOR SPINDLE HEADSTOCKS

BACKGROUND OF THE INVENTION

The present invention generally relates to metal cutting machine tools and, more particularly, a device for protecting the spindle headstock of a machine tool in the case of an accidental collision with a workpiece.

As known, in recent years manufacturers in the field of machine tools have directed their efforts to improve, in addition to the quality of machining, also the efficiency of machine tools by gradually and continuously reducing machine time and machine setup time.

At present, machine time has become reduced thanks to the improvements in the quality of the cutting edges of tools and, in particular, to their wear resistance, and also has become reduced because the cutting speed has increased.

Machine tool manufacturers are now endeavored to reduce, in the work cycle, the machine tool setup time which relates to retooling operations, workpiece loading and unloading operations, workpiece dimensional check operations and, not in the least, positioning operations of the spindle headstock in required various machining configurations.

It can be clearly understood that a reduction of the machine tool setup time is especially important in the case of a 24-hour work cycle, wherein a few minutes lost in the machine tool setup operation during the production of a workpiece, once they are multiplied by the daily production, can result in the loss of several hours.

Since each hour lost in the machine tool setup operation has a negative effect on the returns the invested capital must yield, the importance of reducing the machine tool setup time to a minimum is clearly understood.

For this reason, the current tendency of machine tool manufacturers is to use movable spindle headstocks having very high feed speeds. In particular, the time required for positioning the spindle headstock has been greatly reduced by increasing the feed speed of the spindle headstock to a top limit of 80 m/min by using improved drives.

On the one hand, the increase in the feed speed of the spindle headstock permits a great amount of machine tool setup time to be saved, but on the other hand it exposes the spindle headstock to the risk of colliding with the workpiece as a result of a wrong control, an excessive delay of the response to a control or an inaccurate positioning.

It must be taken in account that because of the inertia and speed involved, in the event of a collision, forces of great intensity would be developed and the resulting decrease of kinetic energy would be converted into internal energy which would be absorbed and dissipated in the workpiece and the spindle headstock, thus causing great damage to both and especially to the latter.

Therefore, any damage to the spindle headstock resulting from a collision with the workpiece must be absolutely avoided because the spindle headstock is easily damaged and accurately designed, and thus an expensive part of the machine tool.

SUMMARY OF THE INVENTION

The present invention is intended to reduce to a minimum the damage to a spindle headstock caused by an accidental collision with a workpiece during the positioning in an operative work configuration by providing a shock-absorbing device for the spindle headstock.

More particularly, the shock-absorbing device is intended to be mounted on the spindle headstock of a machine tool. The spindle headstock includes a motor driven spindle unit connected to an upright by a support. The spindle headstock comprises a yieldable structure connected on one side to the spindle unit and on the other side to the support, and is adapted to yield upon an accidental collision of the spindle headstock with a workpiece. A collision sensor is associated with the yieldable structure for detecting the yielding thereof resulting from an accidental collision of the spindle headstock with the workpiece, and for transmitting in response thereto a signal to a machine tool control unit.

BRIEF DESCRIPTION OF THE DRAWINGS

The features and advantages of the present invention will be clearly understood from the detailed description given for explanatory purposes only and without limitations to its extent with reference to the accompanying drawings, wherein.

DESCRIPTION OF THE PREFERRED EMBODIMENTS

Figure 1:
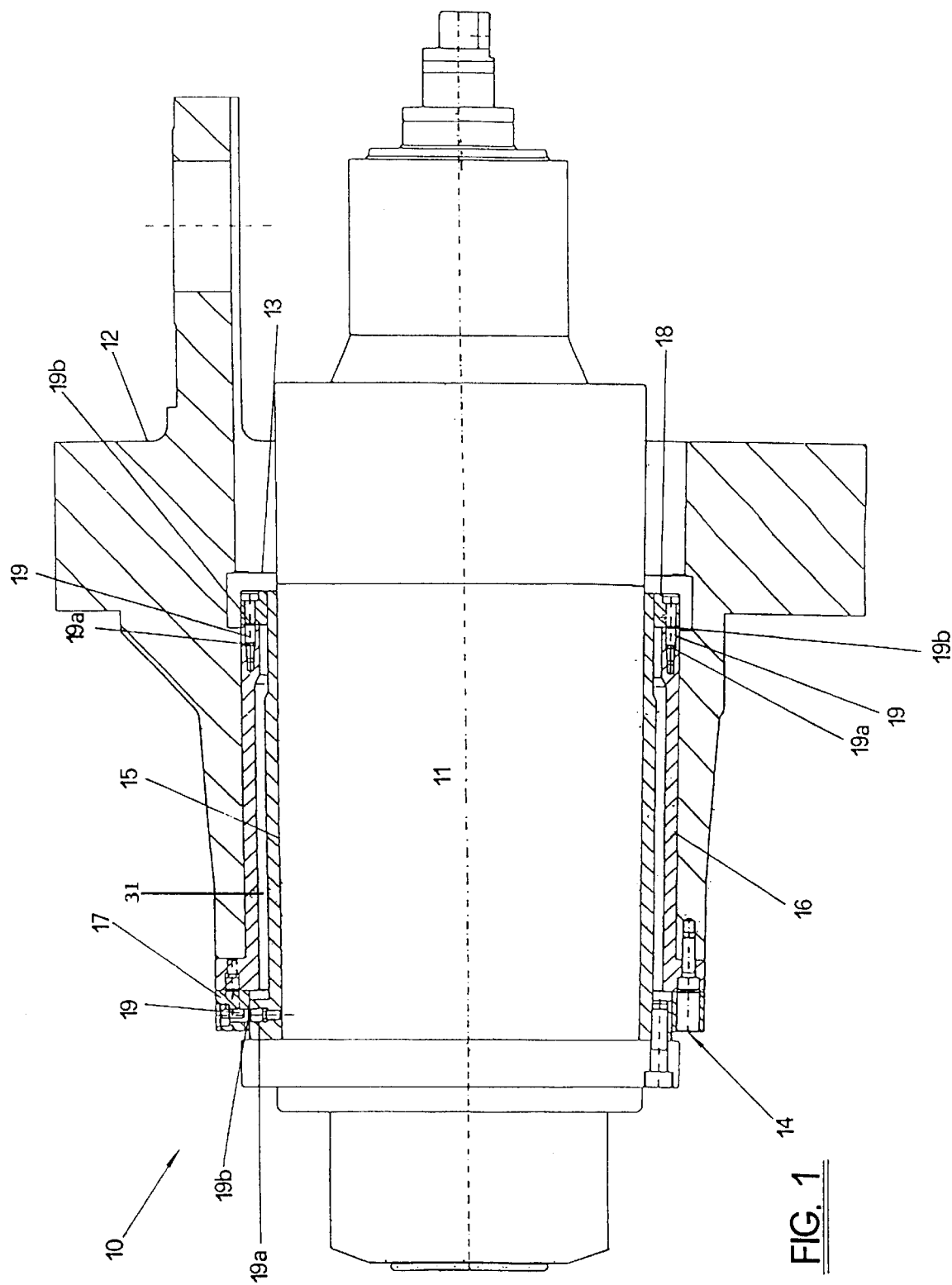
FIG. 1 is a side elevational and partial sectional view of a first preferred embodiment of the spindle headstock of the invention.
Figure 2:
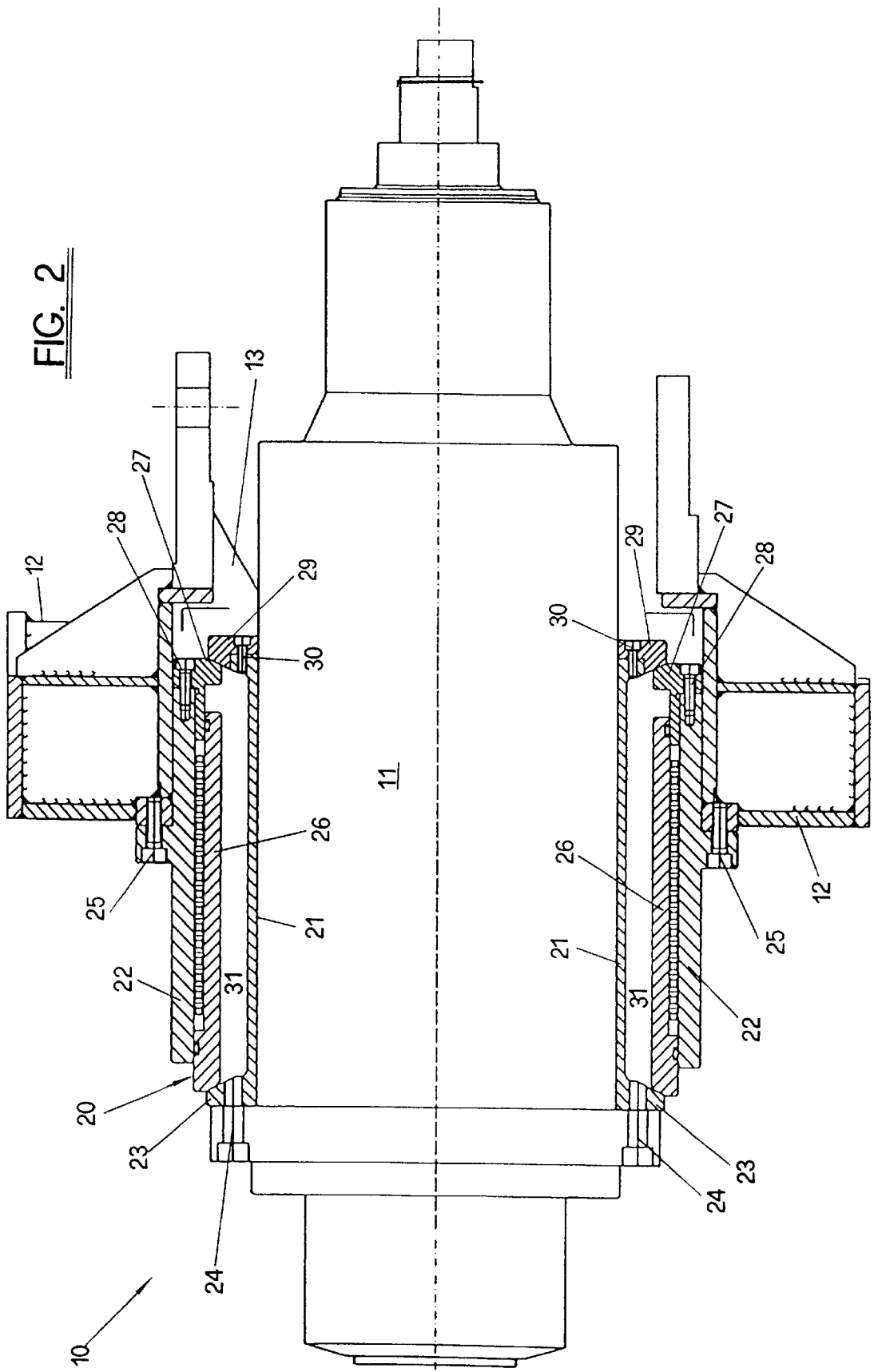
FIG. 2 is a side elevational and partial sectional view of a second preferred embodiment of the spindle headstock of the invention.

As can be seen from FIGS. 1 and 2 of the drawings, according to both embodiments of the invention, the spindle headstock, generally designated by 10, comprises an electric motor driven spindle unit 11 and a support 12 for firmly supporting the spindle unit 11 and securing it to an upright (not shown) of a machine tool.

The support 12 is provided with a substantially cylindrical shaped housing 13 adapted to receive the spindle unit 11.

According to the invention, for connecting the spindle unit 11 to the support 12 a special shock-absorbing device is provided which is capable of permitting the spindle unit 11 to retract inside its housing 13 in the case of a collision against a workpiece, and at the same time to provide an input signal to be transmitted to a machine tool control unit informing that a collision has occurred so that the machine tool can be stopped by decreasing the rotational speed of the spindle. The shock-absorbing device is arranged between the spindle unit 11 and the support 12 and can have different embodiments.

In a first preferred embodiment of the invention, shown in FIG. 1 of the accompanying drawings, the shock-absorbing device is designated by 14 and is represented in a longitudinal section. The shock-absorbing device 14 is formed of two coaxial and spaced apart tubular elements 15 and 16. The element 15 is secured to the spindle unit 11, and the element 16 is secured to the support 12.

The two tubular elements 15 and 16 are connected to each other at their ends by two connecting annuli 17 and 18, respectively, so as to form a closed hollow space 31 therebetween.

The shock-absorbing device 14 is configured so as to be capable of absorbing the energy involved in an accidental collision between the spindle unit 11 and a workpiece, by deformation or by breakage if during the collision the workpiece is subjected to a load greater than normal.

For this purpose, the two connecting annuli 17 and 18 are connected to the tubular elements 15 and 16 by screws 19, which have a rated breaking load. As known, the screws of this kind are adapted to break when they are subjected to a load greater than their rated breaking load. For this purpose, a V-shaped notch 19b is provided in the screw shank 19a for reducing the resistance of the screw so as to cause it to break when it is subjected to a tensile or shear stress having an intensity greater than the corresponding limit values it generally undergoes in the case of a collision between the spindle unit 11 and a workpiece.

In the event of such a collision, the breaking of the screws 19 permits the spindle unit 11 to retract inside the housing 13 and, therefore, to drive the tool spindle away from the workpiece.

In order to detect the breakage of the screws 19, having the rated breaking load, in at least one of the screws a longitudinal bore is provided through which a breakage detector passes. Such a detector can be formed of a fluid under pressure. When breakage of the screws 19 occurs, the resulting pressure change of the fluid is sensed, and converted by a transducer into an output signal to be transmitted to a closed-loop machine tool control unit of the spindle headstock 10. In the retraction of the spindle unit 11 inside the housing 13, the machine tool control unit causes the rotational speed of the tool spindle to be gradually reduced until operation of the machine tool is stopped.

Referring now to FIG. 2 of the drawings, there is shown a second embodiment of the shock-absorbing device according to the present invention. According to this second embodiment, the shock-absorbing device, in this case designated by 20, is formed of two coaxial and spaced-apart tubular elements 21 and 22, wherein the element 21 is secured to it the spindle unit 11 and the element 22 is secured to the support 12.

The tubular element 21 is firmly maintained in position around the spindle unit 11 by an attachment 23. This attachment 23 is provided at one end of the tubular member 21, integrally therewith, and is secured to the spindle unit 11 by screws 24.

The tubular element 22 is secured to the support 12 by screws 25. A sleeve 26 extends beyond the tubular member 22 and into engagement against the attachment 23 of the tubular element 21. The sleeve 26 is coaxially inserted inside the tubular member 22 and is axially movable therein. An annulus 27 connected to the tubular element 22 by screws 28 acts as a stop for the sleeve 26.

An annulus 29 is connected by screws 30 to a free end of the tubular element 21 in order to maintain the spindle unit 11 firmly in position inside the housing 13 of the support 12 during normal work operation of the machine tool. The annulus 27 secured to the tubular element 22 contacts the annulus 29.

The coaxial and spaced-apart tubular elements 21 and 22 defme a substantially cylindrical closed chamber 31 which is filled with fluid under pressure.

The two tubular elements 15 and 16 are connected to each other at their ends by means of two connecting annuli 17 and 18, respectively, so as to form a closed hollow space (31) therebetween.

During normal work operation of the machine tool, the shock-absorbing device 20 maintains the spindle unit 11 fly in position because of the mutual engagement of the tubular elements 21 and 22. As already mentioned, the chamber 31 is closed and is filled with a fluid under pressure.

When the spindle 11 unit is struck suddenly and violently as a result of a collision against a workpiece, the spindle unit 11 retracts inside the housing 13 of the support 12 and at the same time urges the sleeve 26 backwards. As a result of the retraction of the spindle unit 11, the annulus 29 disengages from the annulus 27, thus causing the chamber 31 to open and the fluid contained under pressure therein to flow out.

The resulting fluid pressure change is detected by a pressure transducer and is converted into an output signal to be transmitted to a closed-loop machine tool control unit of the spindle headstock 10. In the retraction of the spindle unit 11 inside the housing 13, the machine tool control unit causes the rotational speed of the tool spindle to be gradually reduced until the operation of the machine tool is stopped.

Once the collision between the spindle unit 11 and the workpiece has occurred, the shock-absorbing device 20 can be easily and readily brought back to the initial condition by filling the chamber 31 with pressurized fluid, thereby making its servicing easy and economical.

Of course, other yieldable structure capable of absorbing and internally dissipating the impact energy resulting from an accidental collision of the spindle headstock against a workpiece, in order to protect the spindle headstock, can be used instead of the shock-absorbing device shown in the Figures.

Also the sensors used for detecting a collision between the spindle headstock and a workpiece can be different from those described above and can operate according to different principles. For instance, photoelectric sensors, position sensors, etc. can be used.

From the foregoing, it can be understood that the invention accomplishes the proposed object and, in particular, it provides a spindle headstock 10 having a spindle unit 11 connected to a support 12 by a shock-absorbing device 14,20 that is capable of imparting to the spindle unit 11 the required stability and resistance, together with positioning accuracy, during the normal work operation of the machine tool, and at the same time is capable of absorbing the impact energy involved in an accidental collision between the spindle headstock 10 and a workpiece in order to protect the integrity of the spindle unit 11.

Such a shock-absorbing device, in its preferred embodiment described above, has a relatively simple configuration and its cost is extremely low compared to that of the spindle headstock as a whole.

Of course, to the shock-absorbing unit according to the invention various modifications and changes can be made without departing from the inventive idea; furthermore, all the accessory parts can be substituted with other parts that are technically equivalent.

What is claimed is:

1. A shock-absorbing device for a spindle headstock of a machine tool, wherein the spindle headstock includes a motor driven spindle unit connected to a support, said shock-absorbing device comprising:

a yieldable structure including a first tubular element having first and second ends and a second tubular element having first and second ends, wherein said first and second tubular elements are co-axially arranged and spaced apart relative to one another with said first end of said first tubular element being engaged with said first end of said second tubular element and said second end of said first tubular element being engaged with said second end of said second tubular element such that a closed space is defined between said first tubular element and said second tubular element, and wherein one of said first and second tubular elements is to be secured to the spindle unit and the other of said first and second tubular elements is to be secured to the support; and a collision sensor associated with said yieldable structure for detecting yielding of said yieldable structure resulting from a collision of the spindle headstock with a workpiece, and for transmitting in response to such yielding a signal to a machine tool control unit, wherein the yielding of said yieldable structure comprises one of
- (i) disengagement of said first end of said first tubular element from said first end of said second tubular element along with disengagement of said second end of said first tubular element from said second end of said second tubular element, and
- (ii) opening of said closed space.

2. The shock-absorbing device according to claim 1, wherein said first end of said first tubular element is engaged with said first end of said second tubular element via a first annular member and a first screw that has a first rated breaking load, said second end of said first tubular element is engaged with said second end of said second tubular element via a second annular member and a second screw that has a second rated breaking load, and the yielding of said yieldable structure comprises
- (i) disengagement of said first end of said first tubular element from said first end of said second tubular element due to breakage of said first screw when, upon the collision of the spindle headstock with the workpiece, the collision force is at least equal to the first rated breaking load, and
- (ii) disengagement of said second end of said first tubular element from said second end of said second tubular element due to breakage of said second screw when, upon the collision of the spindle headstock with the workpiece, the collision force is at least equal to the second rated breaking load.

3. The shock-absorbing device according to claim 2, wherein the first breaking load is defined by a V-shaped annular notch provided in a shank of said first screw, and the second breaking load is defined by a V-shaped annular notch provided in a shank of said second screw.

4. The shock-absorbing device according to claim 2, wherein said collision sensor includes a pressure transducer that is to convert into the signal to be transmitted to the machine tool control unit a pressure change of a hydraulic or pneumatic fluid passing through at least one of said first and second screws, resulting from the breakage of said at least one of said first and second screws.

5. The shock-absorbing device according to claim 2, wherein said collision sensor includes an electromagnetic transducer that is to convert into the signal to be transmitted to the machine tool control unit an interruption of an electromagnetic signal that is passed through at least one of said first and second screws, resulting from the breakage of said at least one of said first and second screws.

6. The shock-absorbing device according to claim 1, wherein said first end of said first tubular element is disengageable and displaceable relative to said first end of said second tubular element, and the yielding of said yieldable structure comprises opening of said closed space by causing said first end of said first tubular element to become disengaged and displaced relative to said first end of said second tubular element upon the collision of the spindle headstock with the workpiece.

7. The shock-absorbing device according to claim 1, wherein said collision sensor includes a pressure transducer that is to convert into the signal to be transmitted to the machine tool control unit a pressure change of a hydraulic or pneumatic fluid within said closed space, resulting from opening of said closed space.

8. A shock-absorbing device for a spindle headstock of a machine tool, wherein the spindle headstock includes a motor driven spindle unit connected to a support, said shock-absorbing device comprising:

a yieldable structure including a first tubular element having first and second ends and a second tubular element having first and second ends, with said first end of said first tubular element being engaged with said first end of said second tubular element and said second end of said first tubular element being engaged with said second end of said second tubular element, and wherein one of said first and second tubular elements is to be secured to the spindle unit and the other of said first and second tubular elements is to be secured to the support; and a collision sensor associated with said yieldable structure for detecting yielding of said yieldable structure resulting from a collision of the spindle headstock with a workpiece, and for transmitting in response to such yielding a signal to a machine tool control unit, wherein the yielding of said yieldable structure comprises disengagement of said first end of said first tubular element from said first end of said second tubular element along with disengagement of said second end of said first tubular element from said second end of said second tubular element.

9. The shock-absorbing device according to claim 8, wherein said first end of said first tubular element is engaged with said first end of said second tubular element via a first annular element and a first screw that has a first rated breaking load, said second end of said first tubular element is engaged with said second end of said second tubular element via a second annular member and a second screw that has a second rated breaking load, and the yielding of said yieldable structure comprises
- (i) disengagement of said first end of said first tubular member from said first end of said second tubular member due to breakage of said first screw when, upon the collision of the spindle headstock with the workpiece, the collision force is at least equal to the first rated breaking load, and
- (ii) disengagement of said second end of said first tubular member from said second end of said second tubular member due to breakage of said second screw when, upon the collision of the spindle headstock with the workpiece, the collision force is at least equal to the second rated breaking load.

10. The shock-absorbing device according to claim 9, wherein the first breaking load is defined by a V-shaped annular notch provided in a shank of said first screw, and the second breaking load is defined by a V-shaped annular notch provided in a shank of said second screw.

11. The shock-absorbing device according to claim 9, wherein said collision sensor includes a pressure transducer that is to convert into the signal to be transmitted to the machine tool control unit a pressure change of a hydraulic or pneumatic fluid passing through at least one of said first and second screws, resulting from the breakage of said at least one of said first and second screws.

12. The shock-absorbing device according to claim 9, wherein said collision sensor includes an electromagnetic transducer that is to convert into the signal to be transmitted to the machine tool control unit an interruption of an electromagnetic signal that is passed through at least one of said first and second screws, resulting from the breakage of said at least one of said first and second screws.

13. A machine tool comprising:

a support;

a spindle headstock including a motor driven spindle unit connected to said support; and a shock-absorbing device, wherein said shock-absorbing device comprises (i) a yieldable structure including a first tubular element secured to one of said spindle unit and said support and having first and second ends, and a second tubular element secured to the other of said spindle unit and said support and having first and second ends, wherein said first and second tubular elements are co-axially arranged and spaced apart relative to one another with said first end of said first tubular element being engaged with said first end of said second tubular element and said second end of said first tubular element being engaged with said second end of said second tubular element such that a closed space is defined between said first tubular element and said second tubular element, and (ii) a collision sensor associated with said yieldable structure for detecting yielding of said yieldable structure resulting from a collision of the spindle headstock with a workpiece, and for transmitting in response to such yielding a signal to a machine tool control unit, wherein the yielding of said yieldable structure comprises one of (a) disengagement of said first end of said first tubular element from said first end of said second tubular element along with disengagement of said second end of said first tubular element from said second end of said second tubular element, and (b) opening of said closed space.

14. The shock-absorbing device according to claim 13, wherein said first end of said first tubular element is engaged with said first end of said second tubular element via a first annular member and a first screw that has a first rated breaking load, said second end of said first tubular element is engaged with said second end of said second tubular element via a second annular member and a second screw that has a second rated breaking load, and the yielding of said yieldable structure comprises (i) disengagement of said first end of said first tubular element from said first end of said second tubular element due to breakage of said first screw when, upon the collision of the spindle headstock with the workpiece, the collision force is at least equal to the first rated breaking load, and (ii) disengagement of said second end of said first tubular element from said second end of said second tubular element due to breakage of said second screw when, upon the collision of the spindle headstock with the workpiece, the collision force is at least equal to the second rated breaking load.

15. The shock-absorbing device according to claim 14, wherein the first breaking load is defined by a V-shaped annular notch provided in a shank of said first screw, and the second breaking load is defined by a V-shaped annular notch provided in a shank of said second screw.

16. The shock-absorbing device according to claim 14, wherein said collision sensor includes a pressure transducer that is to convert into the signal to be transmitted to the machine tool control unit a pressure change of a hydraulic or pneumatic fluid passing through at least one of said first and second screws, resulting from the breakage of said at least one of said first and second screws.

17. The shock-absorbing device according to claim 14, wherein said collision sensor includes an electromagnetic transducer that is to convert into the signal to be transmitted to the machine tool control unit an interruption of an electromagnetic signal that is passed through at least one of said first and second screws, resulting from the breakage of said at least one of said first and second screws.

18. The shock-absorbing device according to claim 13, wherein said first end of said first tubular element is disengageable and displaceable relative to said first end of said second tubular element, and the yielding of said yieldable structure comprises opening of said closed space by causing said first end of said first tubular element to become disengaged and displaced relative to said first end of said second tubular element upon the collision of the spindle headstock with the workpiece.

19. The shock-absorbing device according to claim 13, wherein said collision sensor includes a pressure transducer that is to convert into the signal to be transmitted to the machine tool control unit a pressure change, of a hydraulic or pneumatic fluid within said closed space, resulting from opening of said closed space.

* * * * *